(12) United States Patent
Reddy

(10) Patent No.: US 7,784,547 B2
(45) Date of Patent: Aug. 31, 2010

(54) SUBSEA CONNECTOR INSULATION DEVICE

(75) Inventor: Sanjay Konda Reddy, Houston, TX (US)

(73) Assignee: Deep Sea Technologies, Inc., Houston, TX (US)

( * ) Notice: Subject to any disclaimer, the term of this patent is extended or adjusted under 35 U.S.C. 154(b) by 251 days.

(21) Appl. No.: 11/742,143

(22) Filed: Apr. 30, 2007

(65) Prior Publication Data

US 2008/0063478 A1 Mar. 13, 2008

Related U.S. Application Data

(60) Provisional application No. 60/796,443, filed on May 1, 2006.

(51) Int. Cl.
*E21B 7/12* (2006.01)

(52) U.S. Cl. .............. 166/360; 166/368; 166/345; 285/47; 138/149; 137/375

(58) Field of Classification Search ............ 166/338, 166/345, 356, 360; 405/224.4, 169; 138/149, 138/32; 285/47; 137/375
See application file for complete search history.

(56) References Cited

U.S. PATENT DOCUMENTS

| | | | | |
|---|---|---|---|---|
| 122,396 A * | 1/1872 | McIlhenny | ............. | 292/307 B |
| 968,759 A * | 8/1910 | Fogg | .................. | 292/307 B |
| 1,108,840 A * | 8/1914 | Franke | .................. | 137/375 |
| 1,965,998 A * | 7/1934 | Williams | .............. | 175/325.6 |
| 2,741,268 A * | 4/1956 | Plunkett | ................ | 138/148 |
| 3,650,299 A * | 3/1972 | Seiler et al. | ............. | 138/149 |
| 3,724,491 A * | 4/1973 | Knudsen et al. | ......... | 137/375 |
| 3,734,273 A * | 5/1973 | Watanabe | ............... | 206/389 |
| 3,740,801 A * | 6/1973 | Sears et al. | .............. | 166/241.7 |
| 3,741,252 A * | 6/1973 | Williams | ................ | 138/110 |
| 3,777,501 A * | 12/1973 | Sharp et al. | ............. | 62/50.7 |
| 4,162,093 A * | 7/1979 | Sigmund | ................ | 285/47 |
| 4,207,918 A * | 6/1980 | Burns et al. | ............. | 137/375 |
| 4,258,794 A * | 3/1981 | Sizer et al. | .............. | 166/356 |
| 4,259,981 A * | 4/1981 | Busse | ..................... | 137/375 |

(Continued)

FOREIGN PATENT DOCUMENTS

GB 2165910 A * 4/1986

(Continued)

OTHER PUBLICATIONS

Paddy Collins, "In Situ Insulation of Deep Water Subsea Structures", presentation given at Subtech 2005, Dec. 2005.

(Continued)

*Primary Examiner*—Thomas A Beach
(74) *Attorney, Agent, or Firm*—Meyertons, Hood, Kivlin, Kowert & Goetzel, P.C.; Eric B. Meyertons

(57) ABSTRACT

A subsea insulation device is described. The device includes a frame coupled to and at least partially enclosing a subsea component. A bag may be at least partially enclosed in the frame. The bag may substantially seal against at least one surface of the subsea component when the bag is at least partially inflated. A port may be attached to the bag. The port may allow the bag to be coupled to a fluid provider connector so that fluid can be provided into the bag to inflate the bag.

40 Claims, 5 Drawing Sheets

U.S. PATENT DOCUMENTS

| | | | | |
|---|---|---|---|---|
| 4,266,578 A * | 5/1981 | Swain et al. | ................ | 138/110 |
| 4,300,373 A * | 11/1981 | Camos et al. | ................ | 70/232 |
| 4,366,970 A * | 1/1983 | Hogan, Jr. | ................ | 285/45 |
| 4,543,998 A * | 10/1985 | Thomerson | ................ | 138/110 |
| 4,615,543 A * | 10/1986 | Cannon | ................ | 285/12 |
| 4,696,324 A * | 9/1987 | Petronko | ................ | 137/375 |
| 4,715,439 A * | 12/1987 | Fleming | ................ | 166/68 |
| 4,716,926 A * | 1/1988 | Jacobs | ................ | 137/375 |
| 4,807,669 A * | 2/1989 | Prestidge, Sr. | ................ | 138/178 |
| 4,826,215 A * | 5/1989 | Sullivan | ................ | 285/80 |
| 4,925,605 A * | 5/1990 | Petronko | ................ | 264/46.6 |
| 5,269,572 A * | 12/1993 | Mefferd | ................ | 285/330 |
| 5,303,744 A * | 4/1994 | Eriksson | ................ | 138/110 |
| 5,402,830 A * | 4/1995 | Dortzbach | ................ | 138/110 |
| 5,713,394 A * | 2/1998 | Nygaard | ................ | 138/149 |
| 5,791,379 A * | 8/1998 | Piorkowski | ................ | 138/110 |
| 5,941,287 A * | 8/1999 | Terito et al. | ................ | 138/149 |
| 6,316,751 B1 * | 11/2001 | Wyke et al. | ................ | 219/535 |
| 6,371,693 B1 * | 4/2002 | Kopp et al. | ................ | 405/158 |
| 6,520,261 B1 * | 2/2003 | Janoff et al. | ................ | 166/350 |
| 6,907,907 B2 * | 6/2005 | Maida | ................ | 138/149 |
| 6,919,512 B2 | 7/2005 | Guven et al. | | |
| 2003/0010499 A1 * | 1/2003 | Qvam et al. | ................ | 166/335 |
| 2006/0266523 A1 | 11/2006 | Lower | | |
| 2008/0029270 A1 * | 2/2008 | Wong et al. | ................ | 166/338 |

FOREIGN PATENT DOCUMENTS

| | | |
|---|---|---|
| GB | 2 306 127 | 4/1997 |
| WO | WO 94/04865 | 3/1994 |
| WO | WO 9837355 A1 * | 8/1998 |
| WO | WO 99/40358 | 8/1999 |

OTHER PUBLICATIONS

"Innovators not left in dog house", Keynotes, Autumn 2004, Issue 2, p. 15.

International Search Report and Written Opinion for International Application No. PCT/US2007/067791 mailed Dec. 13, 2007; 13 pages.

* cited by examiner

SUBSEA CONNECTOR INSULATION DEVICE

PRIORITY CLAIM

This patent application claims priority to U.S. Provisional Patent No. 60/796,443 entitled "SUBSEA CONNECTOR INSULATION SHROUD" to Reddy filed on May 1, 2006.

BACKGROUND

1. Field of the Invention

The present invention relates to subsea connectors and devices for insulating the subsea connectors. More particularly, the invention relates subsea connector insulation devices that are installable using remotely operated vehicles (ROVs).

2. Description of Related Art

Subsea oil and gas field developments typically include one or more subsea wells and/or subsea components located at large depths and distances from a gathering platform (e.g., an oil gathering rig). The gathering platform may be a fixed or a floating platform. Production from the subsea wells is routed to the gathering platform through flowlines and/or subsea manifolds.

A field development may be a multi-well subsea development. The multi-well subsea development may include subsea structures such as subsea trees, manifolds, and/or pipeline end manifolds. These subsea structures may be interconnected by pipe jumpers (e.g., rigid pipe jumpers). The jumpers may mate up with the subsea structures using subsea connectors that mate with hubs on the subsea structures. In certain developments, production is routed from the trees into gathering manifolds, and from the gathering manifolds to pipeline end manifolds (PLEMs) and pipelines to the gathering platform.

As fluids flow from the subsea development to the gathering platform, the temperature of the fluids decreases, sometimes significantly, as heat is lost to the surrounding seawater. Measures may be taken to minimize heat lost to the sea water and keep fluid temperatures as high as possible to maintain low viscosity and good flow of fluids within the pipelines. Maintaining flow temperatures for the fluids is especially important when production of the fluids is shut down for any reason (e.g., when pumping of fluids in the pipeline is stopped for maintenance). Without insulation during shutdown, oil may slowly deposit wax or other solids on the interior walls of the subsea components.

Typically, the pipeline itself and piping in the PLEMs, manifolds, trees, and jumpers are insulated to inhibit heat loss to the surrounding seawater. The insulation may be pre-installed on the piping in a manufacturing stage before the structures are installed subsea.

The connectors on the ends of the jumpers, however, cannot be insulated prior to subsea installation. The connectors have moving parts and mating surfaces that have to interface with external tools during the installation process. These features inhibit placing insulation on the connectors prior to installation. Thus, insulation is placed on the connectors "in place" (e.g., after the jumpers are installed). Without insulation, significant heat losses would take place from the connectors.

Remotely operated vehicles (ROVs) are used in many subsea operations to perform work that has been traditionally performed by divers. ROVs may be used to install and/or work on many subsea structures, components, and/or connectors. ROVs may provide for safer and/or more efficient operation than using divers in certain subsea environments (e.g., deep subsea environments).

Current connector insulation systems in the subsea industry typically use insulation that has been molded into a shape that conforms to the outer contours of a connector. The molded insulation may be made as, or split into, parts so that the insulation can be put together during installation. The molded insulation may be in the form of pre-molded and/or rigid blocks (e.g., syntactic foam blocks, or syntactic foam blocks with glass spheres). In certain instances, an ROV is used to install the molded insulation on the connector after the jumper is installed. A can or housing may be placed around the molded insulation to hold the insulation in place. This configuration is generally referred to as a "dog house" type insulation.

The "dog house" configuration is inefficient in providing insulation against heat loss to seawater. The molded insulation in the "dog house" configuration typically does not achieve proper (e.g., positive) contact between the insulation and the surface of the connector. The improper contact does not provide a complete seal between the insulation and the surface of the connector. Thus, heat loss due to convection of seawater between the insulation and the surface of the connector may be significant.

In addition, an ROV may have difficulty installing a "dog house" configuration because, for example, the operator of ROV may not be familiar with or trained to install the insulation. "Dog house" configurations may also be expensive to manufacture (e.g., the molded insulation may have a cost on the order of the cost of the jumper).

Thus, there is a need for insulation systems and/or devices for subsea components (e.g., connectors for subsea jumpers) that are easy to install and provide an efficient insulation barrier between the component and the surrounding seawater. Such systems and/or devices may provide a substantial seal against a surface of the subsea component that inhibits fluid from flowing or circulating between the insulating device and the subsea component.

SUMMARY

In certain embodiments, a subsea insulation device includes a frame coupled to and at least partially enclosing a subsea component. A bag may be at least partially enclosed in the frame. The bag may substantially seal against at least one surface of the subsea component when the bag is at least partially inflated. In certain embodiments, a port is attached to the bag. The port may be used to couple the bag to a fluid provider connector so that fluid can be provided into the bag to inflate the bag.

In certain embodiments, the subsea insulation device is installed using a remotely operated vehicle (ROV). The frame may provide structural support for the bag. In some embodiments, the frame is a clamp structure (e.g., a clamp shroud). Jaws of the clamp may pivot to open and close around the subsea component. In some embodiments, a closing mechanism operates to close the clamp around the subsea component.

In certain embodiments, the device includes a latch. The latch may secure the frame around the subsea component. In some embodiments, the latch is automatically engaged to secure the frame around the subsea component. In a clamp frame embodiment, the latch engages to secure the jaws closed around the subsea component.

In certain embodiments, the fluid used to inflate the bag is an incompressible and/or insulating fluid. The inflated bag may thermally insulate the subsea component from the surrounding environment. The bag may at least partially conform to the surface of the subsea component when inflated. The bag may substantially seal against the surface of the subsea component to inhibit fluid from circulating between the bag and the surface of the subsea component. Inhibiting the circulation of fluid (e.g., seawater) between the bag and the surface of the subsea component reduces convective heat loss from the component to the surrounding environment. Inflation of the bag around the subsea component provides a reliable, cost effective, and easily implemented substantial seal against the circulation of fluid between the bag and the surface of the subsea component.

BRIEF DESCRIPTION OF THE DRAWINGS

Features and advantages of the methods and apparatus of the present invention will be more fully appreciated by reference to the following detailed description of presently preferred but nonetheless illustrative embodiments in accordance with the present invention when taken in conjunction with the accompanying drawings in which.

Figure 1:
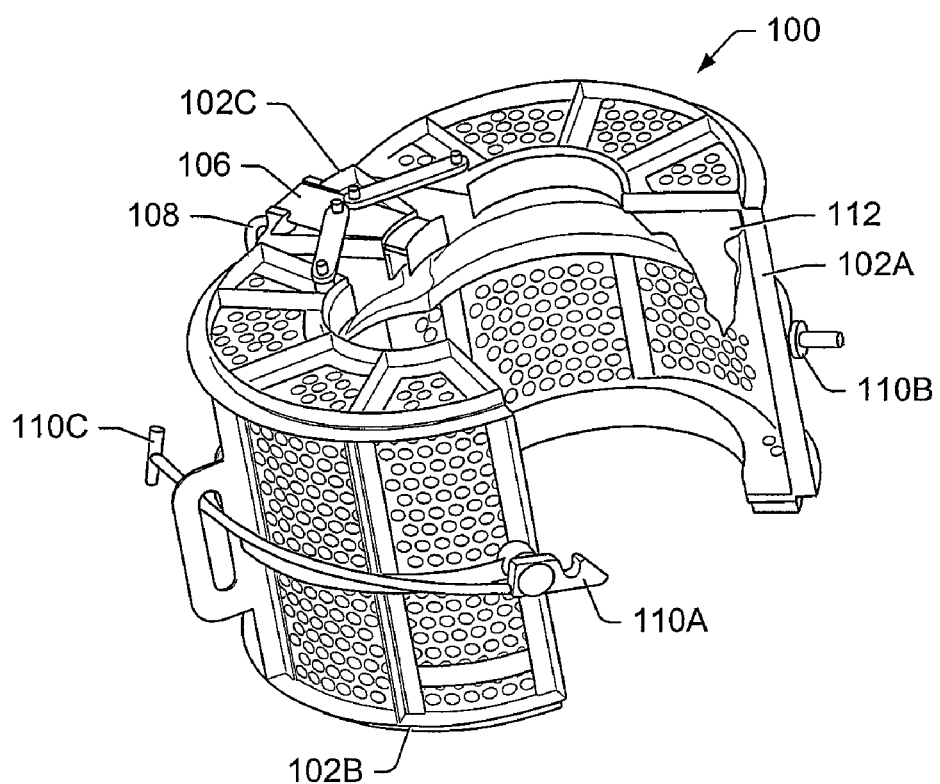
FIG. 1 depicts a perspective representation of an embodiment of a subsea connector insulation device in an open configuration.

While the invention is susceptible to various modifications and alternative forms, specific embodiments thereof are shown by way of example in the drawings and will herein be described in detail. The drawings may not be to scale. It should be understood that the drawings and detailed description thereto are not intended to limit the invention to the particular form disclosed, but to the contrary, the intention is to cover all modifications, equivalents and alternatives falling within the spirit and scope of the present invention as defined by the appended claims.

DETAILED DESCRIPTION OF EMBODIMENTS

In the context of this patent, the term "bag" means a container that can be conformed and is configured to at least partially contain, or enclose, one or more objects and/or materials. The bag may be inflatable. The bag may be inflated using a fluid (e.g., a gas, a liquid, a gel, and/or a slurry).

In the context of this patent, the term "coupled" means either a direct connection or an indirect connection (e.g., one or more intervening connections) between one or more objects or components. The phrase "directly connected" means a direct connection between objects or components such that the objects or components are connected directly to each other so that the objects or components operate in a "point of use" manner.

Figure 2:
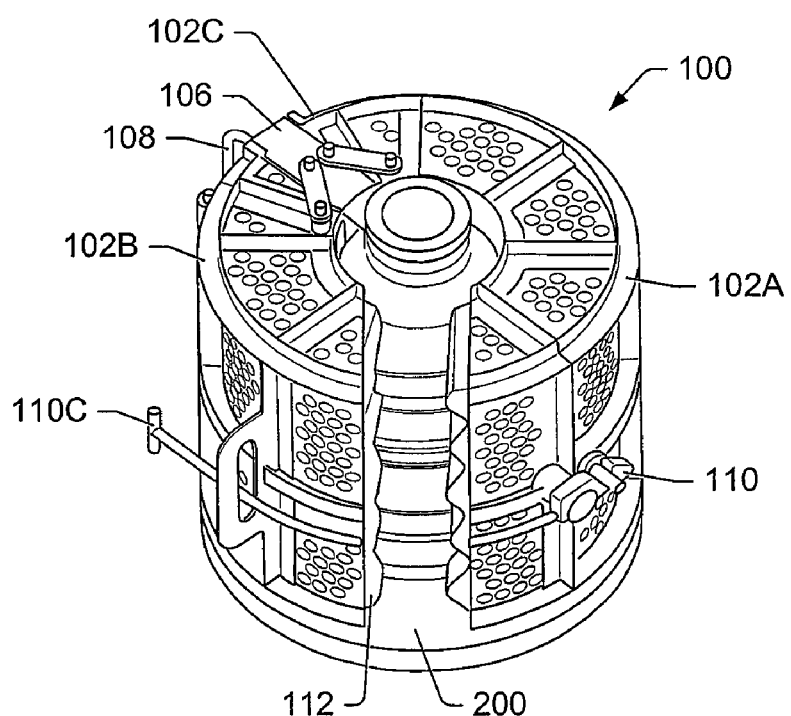
FIG. 2 depicts a perspective representation of an embodiment of a subsea connector insulation device in a closed configuration around a subsea connector with a portion of the device sectioned to show the subsea connector.
Figure 3:
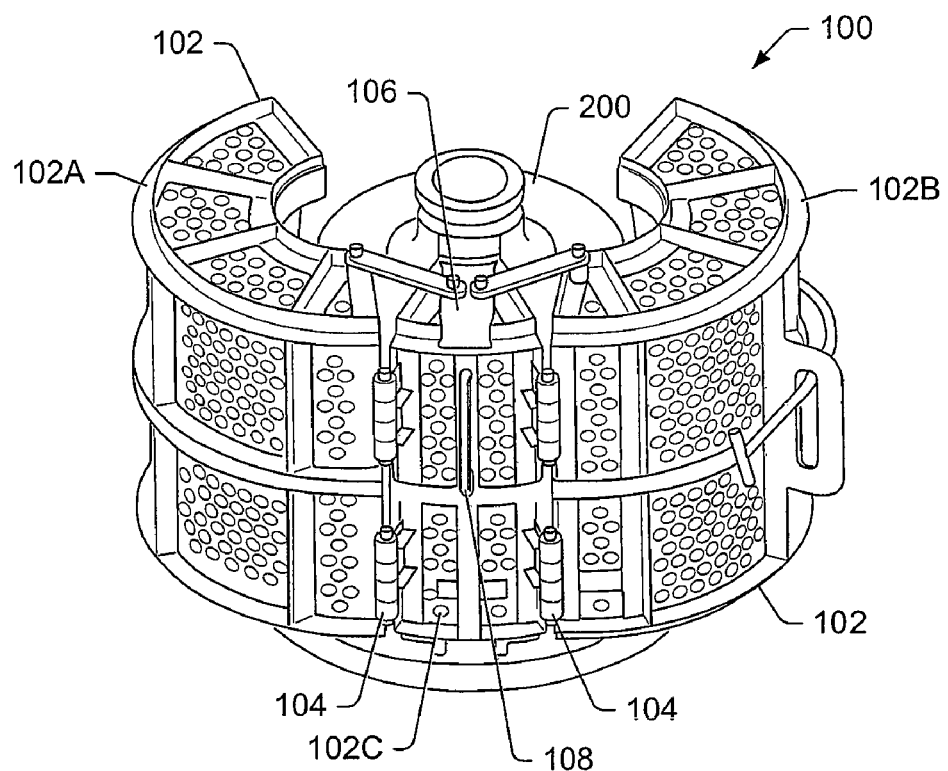
FIG. 3 depicts a perspective view emphasizing the rear of an embodiment of a subsea connector insulation device being installed around a subsea connector.

FIG. 1 depicts a representation of an embodiment of subsea connector insulation device 100 in an open configuration. FIG. 2 depicts a representation of an embodiment of device 100 in a closed configuration around subsea connector 200 with a portion of the device sectioned to show the subsea connector. FIGS. 3-6 depict various perspective views of an embodiment of device 100 being installed around subsea connector 200. In certain embodiments, device 100 is used to cover and insulate subsea connector 200. Subsea connector 200 may be, in certain embodiments, a connector for a subsea jumper. In some embodiments, device 100 may be used to cover and/or insulate other subsea components such as, but not limited to, pipelines, pipeline connectors, hubs, manifolds and components associated with manifolds, trees and components associated with trees, valves, pumps, and other components which need to be insulated after the equipment is installed underwater.

In certain embodiments, device 100 includes frame 102. Frame 102 may be a shroud or other enclosure that can surround or at least partially surround a subsea component such as subsea connector 200. Frame 102 may be any shape that allows the frame to surround or at least partially surround subsea connector 200. Frame 102 may be made of light, structurally strong materials. In certain embodiments, frame 102 has holes or openings in the frame to make the frame lighter and/or allow the frame to move easier through water. In one embodiment, frame 102 has solid structural frame with sheet material having round holes covering the structural frame. A lightweight frame 102 allows an ROV or other tool to easily maneuver and install the frame. Structurally strong materials are used for frame 102 so that the frame can withstand pressures at large subsea depths and so that the frame can maintain its structural integrity during use and installation. In some embodiments, frame 102 is made of corrosion resistant materials and/or has a suitable corrosion resistant coating. For example, frame 102 may be made of stainless steel, titanium, fiberglass, rubber, and/or plastic. In some embodiments, corrosion of frame 102 is inhibited by cathodic protection of the frame.

Frame 102 may have pivoting connections to allow portions of the frame to open and close (e.g., the frame may have jaws that open and close about one or more pivot points). In certain embodiments, frame 102 is a clamp structure (e.g., a clamp shroud). As shown in FIGS. 1-6, frame 102 is a three-part clamp shroud designed to be clamped around a subsea connector. The three parts of frame 102 are jaws 102A, 102B that clamp around the subsea connector and hinge section 102C. Jaws 102A, 102B and hinge section 102C may be coupled with hinges 104, shown in FIGS. 3 and 4, or any other suitable coupling that allows the jaws to be open and closed around the subsea connector. In certain embodiments, jaws 102A, 102B are designed to be placed over connector 200 from the side, as shown in FIGS. 3-6. In other embodiments, frame 102 and jaws 102A, 102B are designed to be placed over connector 200 from the top and/or bottom (e.g., the device may be placed over the connector along a pipe or jumper leading to the connector).

As shown in FIGS. 1-6, device 100 may include closing mechanism 106. Closing mechanism 106 may be used to open and close jaws 102A, 102B. In certain embodiments, closing mechanism 106 operates to close jaws 102A, 102B when frame 102 is pushed onto connector 200. For example, the ROV or another tool may push on handle 108 to push frame 102 onto connector 200. As frame 102 is pushed onto connector 200, closing mechanism 106 may push against the connector and operate to close jaws 102A, 102B. In some embodiments, closing mechanism 106 includes a spring lock to secure jaws 102A, 102B closed. In some embodiments, closing mechanism 106 is a screw type mechanism that is used to close the jaws of frame 102. The ROV may operate the screw type mechanism using a running tool or other type of robot arm. In some embodiments, the screw type mechanism includes a right angle drive to allow the ROV to operate the mechanism from a right angle.

Frame 102 may include handle 108 to allow the ROV or another tool to hold on to, transport, and/or maneuver the frame. Handle 108 may be located at a location on frame 102 that allows for easy access to the handle. Handle 108 may have any shape that allows the ROV or another tool to easily couple to (e.g., grasp) and manipulate frame 102. Handle 108 may be mounted on frame 102 or integrally formed as a part of the frame.

In certain embodiments, latch 110 is coupled to frame 102. Latch 110 includes arm 110A and catch 110B. Arm 110A has a mechanism for coupling to catch 110B (e.g., the arm engages the catch to secure the latch). For example, arm 110A may have a hook that hooks over catch 110B, as shown in FIGS. 1-6. Latch 110 is used to secure jaws 102A, 102B together when frame 102 is closed around connector 200. In certain embodiments, arm 110A automatically engages catch 110B when jaws 102A, 102B are brought together. In certain embodiments, latch 110 includes release handle 110C. The ROV or another tool may use release handle 110C to disengage arm 110A and catch 110B and open the latch and allow jaws 102A, 102B to come apart and open frame 102. In some embodiments, latch 110 includes a locking mechanism that may be operated by the ROV or another tool. The locking mechanism may be used to ensure that latch 110 remains engaged and does not open accidentally or unintentionally. For example, the locking mechanism may ensure that the latch remains engaged when bag 112 is inflated and pressurized with fluid.

In certain embodiments, as shown in FIGS. 1-6, device 100 includes bag 112. Bag 112 may be made of material with that allows for repeated inflation/deflation of the bag. Bag 112 may be made of materials that do not deteriorate over time in seawater and/or at the operating temperatures in the subsea environment. Bag 112 may also be made of material that is chemically inert (e.g., does not react with) material or fluid used to fill the bag. In certain embodiments, bag 112 is made of rubber, mylar, polymer, elastomeric materials, or a combination thereof. For example, bag 112 may be made of polyethylene material. In some embodiments, bag 112 has one or more reinforcing ribs to provide structural strength to the bag. In some embodiments, bag 112 is pre-shaped and/or distensible. In some embodiments, bag 112 and frame 102 are integrated as a single structure. For example, the frame may be integrated as part of the bag or vice versa.

As shown in FIGS. 1-6, bag 112 is located within frame 102. Bag 112 may be coupled to frame 102. For example, bag 112 may be attached to the inside of frame 102. Bag 112 may be attached to frame 102 along the length of the frame or at selected points along the frame. In certain embodiments, bag 112 is contained within (e.g., located inside) frame 102. For example, bag 112 may line the inner wall of frame 102.

Figure 4:
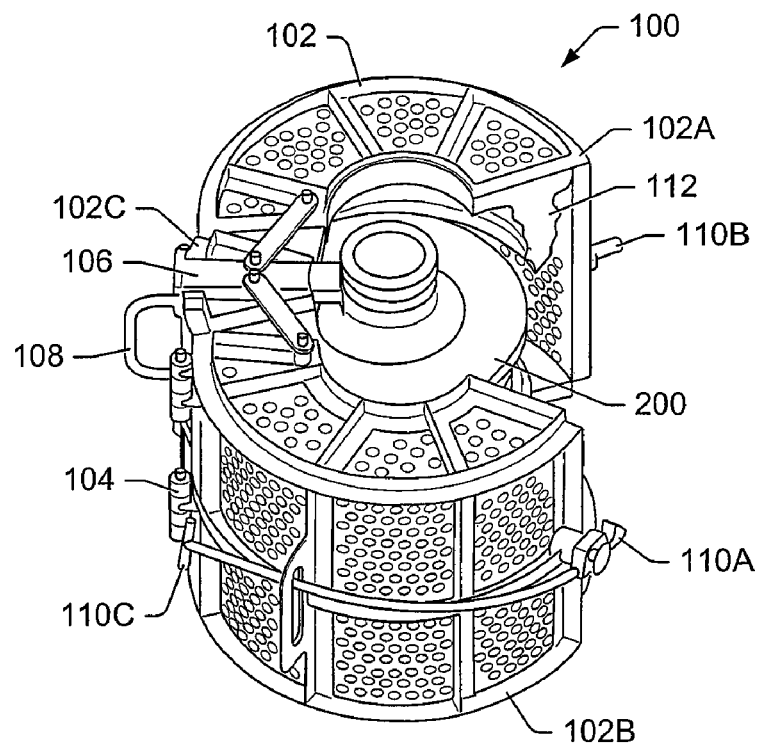
FIG. 4 depicts a perspective view emphasizing the side of an embodiment of a subsea connector insulation device being installed around a subsea connector.
Figure 5:
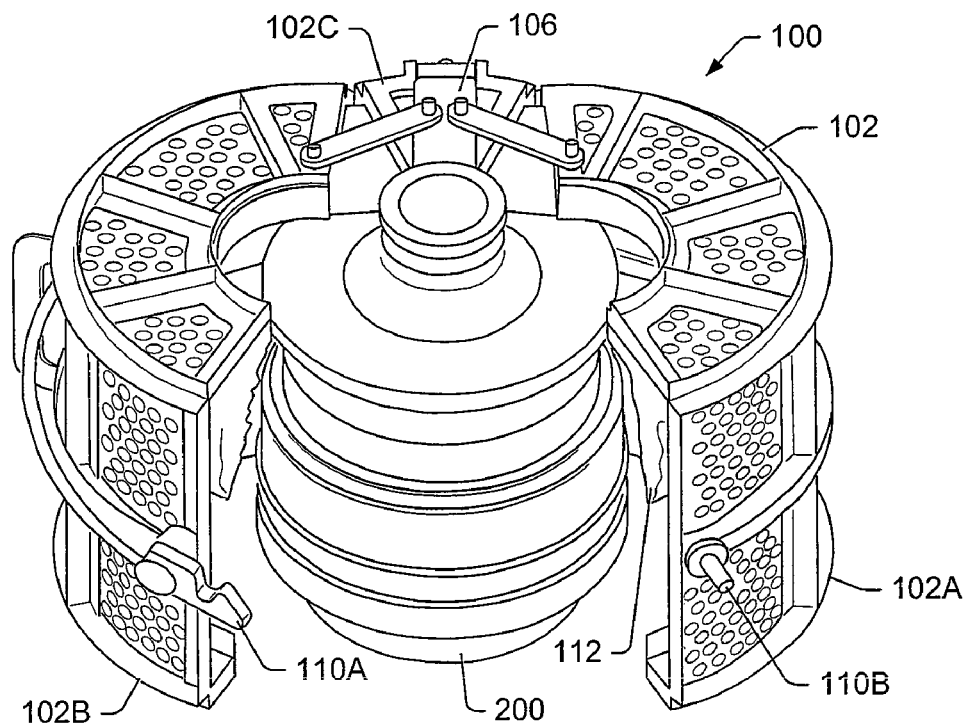
FIG. 5 depicts a perspective view emphasizing the front of an embodiment of a subsea connector insulation device being installed around a subsea connector.
Figure 6:
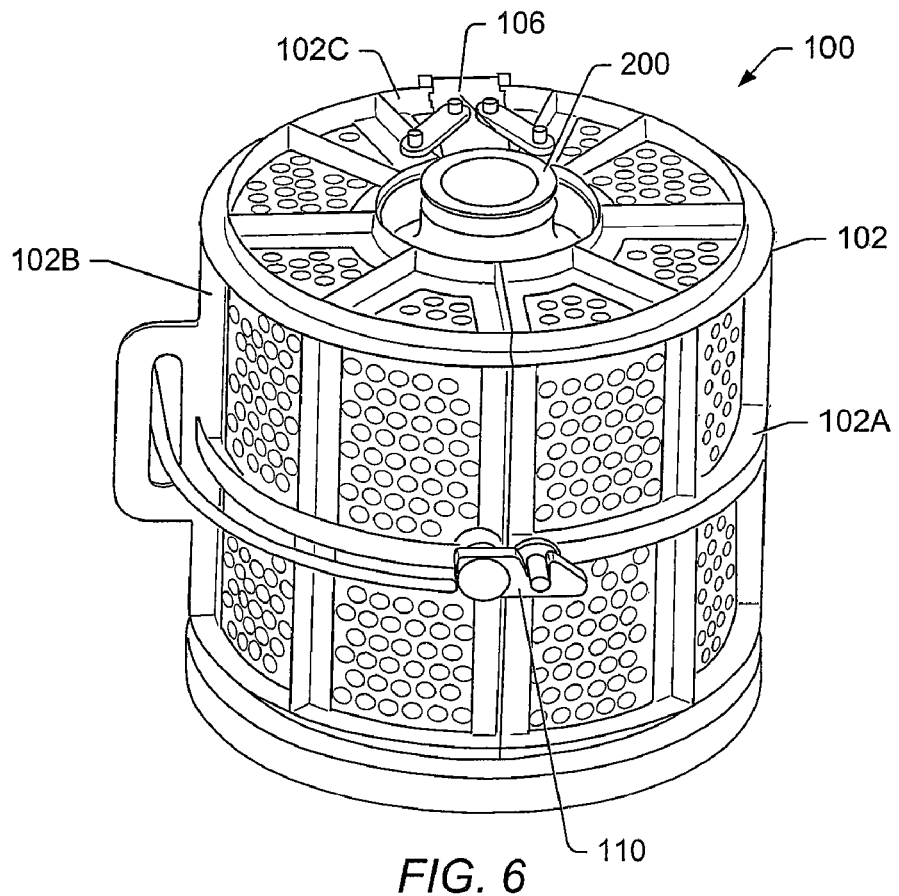
FIG. 6 depicts a perspective view emphasizing the front of an embodiment of a subsea connector insulation device installed and closed around a subsea connector.
Figure 7:
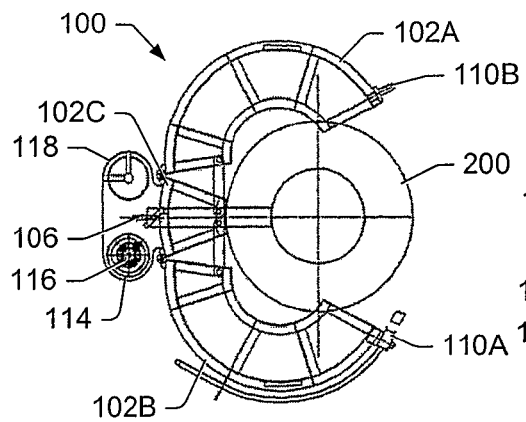
FIG. 7 depicts a top view of an embodiment of a subsea connector insulation device (with hot stab and receptacle) being installed around a subsea connector.
Figure 8:
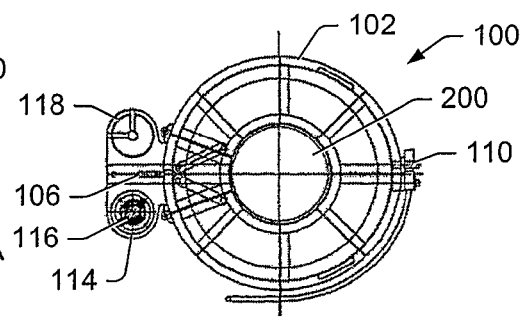
FIG. 8 depicts a top view of an embodiment of a subsea connector insulation device (with hot stab and receptacle) installed and closed around a subsea connector.
Figure 9:
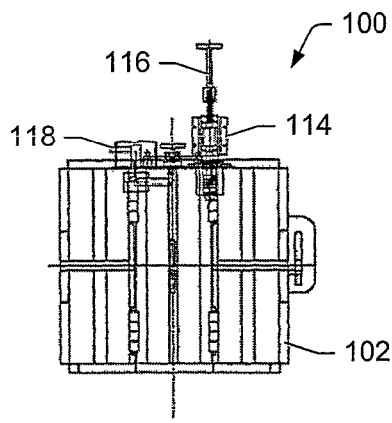
FIG. 9 depicts a rear view of an embodiment of a subsea connector insulation device (with hot stab and receptacle) installed and closed around a subsea connector.
Figure 10:
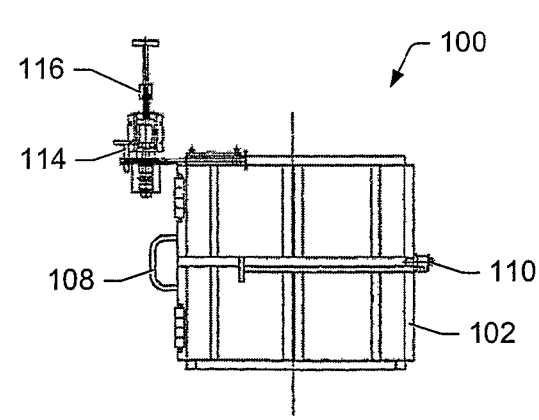
FIG. 10 depicts a side view of an embodiment of a subsea connector insulation device (with hot stab and receptacle) installed and closed around a subsea connector.

Bag 112 is shown in a deflated state in FIGS. 1 and 3-6. In the deflated state, bag 112 may allow space along frame 102 for water to flow through the frame. This may allow device 102 to be easily maneuvered by, for example, the ROV or another tool while bag 112 is deflated. Also, jaws 102A, 102B may be opened and closed more easily when bag 112 is deflated. As shown in FIG. 1, bag 112 may be attached to an upper portion of frame 102. In some embodiments, bag 112 may be attached to other portions of frame 102. Bag 112 may be attached to frame 102 so that the bag does not extend beyond the ends of jaws 102A, 102B, as shown in FIGS. 1, 4, and 5. Bag 112 may be closed off at the ends of jaws 102A, 102B so that device 100 is easily placed over connector 200 without any portion of the bag catching on the connector during installation of the device.

In certain embodiments, bag 112 is inflated to provide at least a partial seal against connector 200, as shown in FIG. 2. Bag 112 may be inflated with a fluid. In certain embodiments, bag 112 is inflated with an insulation fluid. The insulation fluid may be substantially incompressible as well as insulating. In some embodiments, the insulation fluid acts as a heat sink (e.g., the bag has to be cooled by seawater before the connector begins to be cooled by the seawater). The insulation fluid may include, but is not limited to, water, gel, foam, slurry, glass beads, epoxy liquid, and/or combinations thereof. In certain embodiments, the insulation fluid includes DeepGel or DeepGel ROV available from Ythan Environmental Services, Ltd. (Ellon Aberdeen, Scotland, United Kingdom). In some embodiments, the insulation fluid includes an epoxy slurry containing glass beads. In some embodiments, the insulation fluid may solidify or set over time and prevent loss of insulation should bag 112 leak or tear. For example, the epoxy slurry may cure or set over time to create the backup seal. In some embodiments, frame 102 is removed after the insulation has solidified or set. The removed frame may be fitted with another bag and used on another connector.

When bag 112 is inflated, the bag at least partially seals, or substantially seals, against the surface of connector 200. Frame 102 inhibits bag 112 from extruding or inflating outwards away from connector 200. The properties of bag 112 allow the bag to at least partially conform, or substantially conform, to irregular shaped surfaces of connector 200. In certain embodiments, bag 112 substantially conforms to the irregular shaped surfaces on connector 200 to seal against the surfaces of the connector. However, bag 112 may not completely conform to some of the irregular shaped surfaces on connector 200 because, for example, there may be a sharp change in the contour of the surface at a groove in the surface of the connector. Although bag 112 may not be able to completely conform to such a groove, the bag may provide a substantial seal over the groove that inhibits fluid from circulating between the surface of the groove and the bag.

The properties of bag 112 allow the bag to substantially fill crevices or grooves on the surfaces of connector 200 so that the bag has substantially complete contact with the surfaces of the connector. The substantially complete contact between bag 112 and the surfaces of connector 200 substantially inhibits (e.g., minimizes or eliminates) fluid from circulating in the space between the bag and the connector. Inhibiting the circulation of fluid (e.g., seawater) between bag 112 and the surface of connector 200 reduces convective heat loss from the connector to the surrounding environment. Bag 112 and frame 102 are designed to ensure that there is substantial surface contact between the bag and connector 200. Inflation of bag 112 around connector 200 provides a reliable, cost effective, and/or easily implemented substantial seal against the circulation of fluid between bag 112 and connector 200.

In some embodiments, bag 112 wraps around one or more ends of connector 200. For example, bag 112 may wrap around an end of connector 200 to provide an L-shaped cross-section around the end of the connector. Wrapping of bag 112 around end of connector 200 may provide a substantial barrier to circulation of fluid between the bag and the surface of the connector.

In some embodiments, bag 112 is preformed to a shape of connector 200. For example, bag 112 may be preformed to a shape that follows the surface contours of connector 200. Bag 112 may be made of an elastic memory material that is preformed to the desired shape. Bag 112 will expand to the desired shaped when inflated. In addition, bag 112 may have some elasticity to allow the bag to stretch or contract without substantially deforming from the preformed shape when inflated.

FIGS. 7-11 depict embodiments of device 100 with receptacle port 114. Port 114 is in fluid communication with the inside of bag 112. Port 114 allows fluid to be provided into bag 112. Port 114 may be coupled to frame 102. Frame 102 may provide mechanical support for port 114. In certain embodiments, device 100 includes isolation valve 118, shown in FIGS. 7-9. Valve 118 is in fluid communication with the inside of bag 112 and port 114. Valve 118 may be located between port 114 and bag 112 to control fluid flow between the port and the bag. In certain embodiments, valve 118 is used to isolate pressure in bag 112. For example, valve 118 may be closed after inflation of bag 112 to isolate (e.g., seal off) the bag and inhibit fluid from leaking out of the bag and keep the bag inflated.

Figure 13:
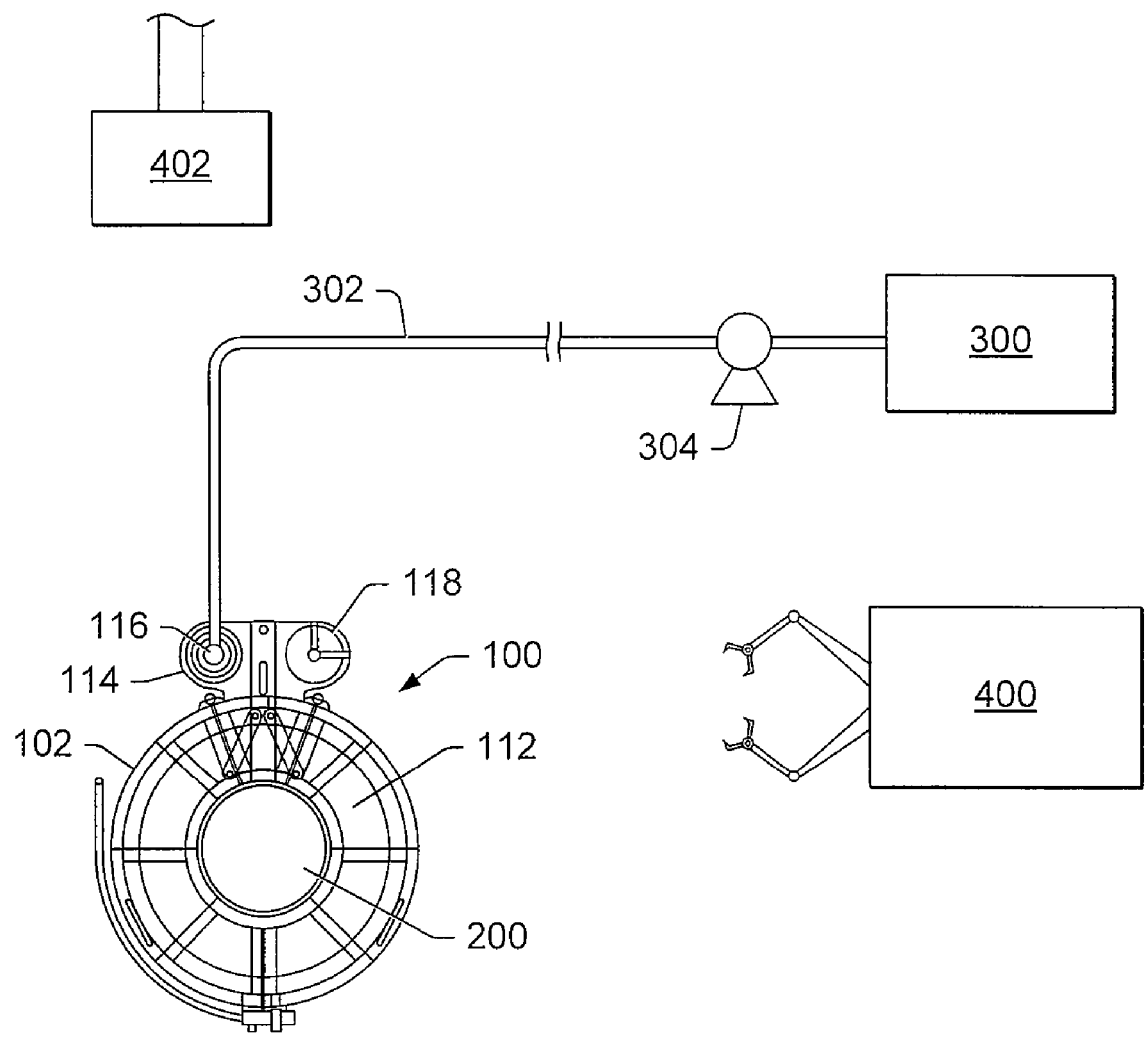
FIG. 13 depicts a representation of an embodiment of a subsea connector insulation device coupled to a fluid source.

An operator (e.g., the ROV or another tool) may use fluid provider connector 116 to provide fluid through port 114 into bag 112 from a fluid source (e.g., a fluid reservoir). FIG. 13 depicts a representation of an embodiment of device 100 coupled to fluid source 300. Also depicted is remote operated vehicle (ROV) 400 and running tool 402. Fluid source 300 is coupled to device 100 at port 114 using fluid provider connector 116. Fluid source 300 provides fluid to bag 112 through port 114. Conduit 302 provides a path for fluid from fluid source 300 to bag 112. Conduit 302 may be coupled to port 114 using fluid provider connector 116. In some embodiments, fluid source 300 and/or conduit 302 are located on, or attached to, ROV 400. In some embodiments, fluid source 300 and/or conduit are located remotely (e.g., on the surface) and are coupled to device 100 using ROV 400 or another tool.

In certain embodiments, pump 304 is used to provide a flow of fluid (e.g., pressurize the fluid for flow) from fluid source 300 to bag 112. In some embodiments, pump 304 is located on ROV 400. For example, pump 304 may be on ROV 400 with a conduit coupled between fluid source 300 (located on the surface) and ROV 400 and another conduit (e.g., conduit 302) coupled between the pump on ROV 400 and device 100. In some embodiments, pump 304 is located remotely (e.g., on the surface). In some embodiments, fluid source 300 and the pump 304 are located remotely from ROV 400 with conduit 302 coupling to ROV 400, which then provides the fluid to bag 112 through another conduit.

In certain embodiments, port 114 is a hot stab receptacle and fluid provider connector 116 is a hot stab. Port 114 may be, for example, an ROV hot stab receptacle and fluid provider connector 116 is an ROV hot stab. The ROV hot stab receptacle allows ROV hot stab to provide fluid into bag 112. In some embodiments, a dummy fluid provider connector (e.g., a dummy or blind hot stab) is provided to seal off port 114 when the port is not in use (e.g., isolate the port). The dummy fluid provider connector may be put into place using the ROV 400 or another tool. For example, ROV 400 may put the dummy fluid provider connector on port 114 after inflating bag 112.

In some embodiments, two or more bags 112 may be positioned in frame 102. Using two or more bags 112 may require the use of more than one port 114 to provide fluid to the bags. ROV 400 or another tool may provide fluid to bags 112 one at a time or simultaneously. The use of multiple bags 112 in frame 102 may reduce the inflation time for the bags compared to inflating a single large bag. In addition, having more than one bag may provide enhanced reliability. For example, if one of the bags fails, one or more of the other bags may be used to compensate for the failed bag.

FIGS. 3, 4, 5, and 7 show device 100 in an installation position on connector 200. In the installation position, jaws 102A, 102B are open to allow device 100 to be placed on connector 200. Device 100 is typically installed on connector 200 after installation and testing of the connector and its associated components (e.g., jumpers, valves, and/or manifolds). In addition, any tools used to install connector 200 and its associated components may be removed from the area around the connector.

Before installation, device 100 is inspected and prepared on the surface (e.g., out of the water and/or on a gathering platform or sea vessel). In certain embodiments, bag 112 is assessed to ensure that there is no trapped air or air pockets inside the bag. Valve 118 (depicted in FIG. 7) may be used to evacuate and isolate the inside of bag 112 to inhibit air from getting into the bag. Device 100 may be prepared for installation by affixing jaws 102A, 102B into an open position (e.g., the position depicted in FIGS. 1, 3, 4, 5, and 7). In some embodiments, jaws 102A, 102B are affixed in the open position using a pull-pin. The pull-pin inhibits jaws 102A, 102B from closing until the pull-pin is removed. The pull-pin may be removed, for example, by the ROV or another tool during installation.

In certain embodiments, device 100 may be taken near a location of installation using a basket (e.g., a tool or utility basket). The basket may be parked or located near the location of installation to allow the ROV or another tool to access device 100. The ROV or another tool may couple to device 100 and move the device to the location of connector 200. For example, the ROV or another tool may grasp handle 108 to maneuver device 100.

Figure 11:
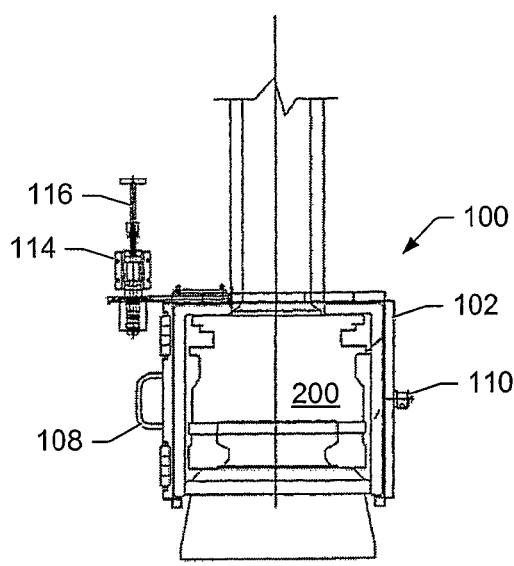
FIG. 11 depicts a section view of an embodiment of a subsea connector insulation device (with a port and a fluid provider connector) installed and closed around a subsea connector (with a jumper and a hub shown on the subsea connector).
Figure 12:
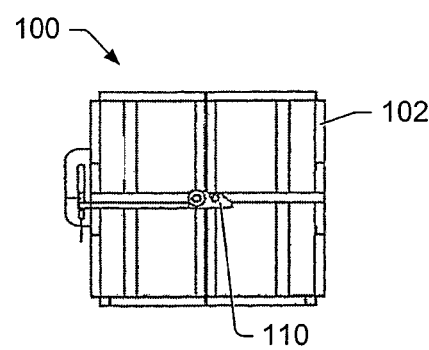
FIG. 12 depicts a front view of an embodiment of a subsea connector insulation device installed and closed around a subsea connector.

Device 100 may be maneuvered (e.g., slid) over connector 200 so that the device is in the installation position, as shown in FIGS. 3, 4, 5, and 7. At this point, the pull-pin or any other device keeping the jaws 102A, 102B open may be removed. Device 100 is then moved (e.g., pushed) further onto connector 200 so that closing mechanism 106 operates to close jaws 102A, 102B. Movement of device 100 onto connector 200 is continued until latch 110 engages and secures the device on the connector, as shown in FIGS. 2, 6, and 8-12. FIG. 11 depicts a section view of an embodiment of device 100 (with port 114 and fluid provider connector 116) installed and closed around subsea connector 200 (with a jumper and a hub shown on the subsea connector).

The ROV or another tool may be used to ensure that device 100 is properly installed on connector 200. For example, the ROV or another tool may have a camera to allow an operator to visually inspect device 100 and/or a tool may be used to move or attempt to move the device. After inspection, the ROV or another tool may remove any dummy fluid provider connector from device 100.

After the dummy fluid provider connector is removed from device 100, bag 112 may be inflated using fluid provided by fluid source 300. After fluid source 300 is coupled to bag 112, valve 118 may be opened and fluid provided into bag 112 to inflate the bag. The fluid inflates bag 112 to a selected pressure (e.g., the pressure required for proper sealing on connector 200). In some embodiments, some fluid may be removed from bag 112 to ensure that there are no air pockets in the bag after inflation. After inflation of bag 112, valve 118 may be closed and the dummy fluid provider connector reinstalled. The ROV or another tool may inspect device 100 and bag 112 for proper installation on connector 200.

In some embodiments, the ROV is not able to directly install device 100 on connector 200. For example, connector 200 may be located in a cramped location in which the ROV cannot operate and/or maneuver. In such embodiments, the ROV may use a tool (e.g., a running tool) to install device 100. For example, device 100 may be put inside the tool and the ROV may operate the tool to install the device on connector 200. The ROV may bring the tool to the surface after installation of device 100. In some embodiments, the running tool is operated without use of the ROV (e.g., the running tool operates automatically after being put into position).

In some instances, device 100 may have to be removed. For example, device 100 may have to be removed if a jumper has to be retrieved for any reason (e.g., failure or maintenance). In certain embodiments, fluid inside bag 112 is removed from the bag to deflate the bag before removing device 100 from connector 200. The process described above for inflating bag 112 can be reversed to deflate the bag.

After deflation of bag 112, latch 110 may be disengaged by, for example, activating latch handle 110C. Disengaging latch 110 allows device 100 to be removed from connector 200. Jaws 102A, 102B may open as device 100 is removed from connector 200. In some embodiments, device 100 is removed from connector 200 without deflating bag 112 prior to removal. Device 100 may be removed from connector 200 using the same procedure as if bag 112 is deflated.

It is to be understood the installation of device 100 is not limited to particular methods described above which may, of course, vary. Other methods and/or equipment known in the art or developed for use in the art may be used to install and implement device 100.

It is to be understood the invention is not limited to particular systems described which may, of course, vary. It is also to be understood that the terminology used herein is for the purpose of describing particular embodiments only, and is not intended to be limiting. As used in this specification, the singular forms "a", "an" and "the" include plural referents unless the content clearly indicates otherwise. Thus, for example, reference to "a bag" includes a combination of two or more bags and reference to "a fluid" includes mixtures of fluids.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A subsea insulation device, comprising:
   a frame that is, during use, coupled to and at least partially encloses a subsea component, wherein the frame is, during use, installed at subsea depths and maintains its structural integrity at subsea pressures;
   a bag at least partially enclosed in the frame during use to substantially seal at least one surface of the subsea component; and
   a port attached to the bag, the port, during use, allowing the bag to be coupled to an insulating fluid connector such that insulating fluid can be provided into the bag to at least partially inflate the bag while the bag is at subsea depths and while the bag is at least partially enclosed in the frame.

2. The device of claim 1, wherein the device is configured to be installed using a remotely operated vehicle (ROV).

3. The device of claim 1, wherein the device is configured to be installed using a running tool.

4. The device of claim 1, wherein the frame provides structural support for the bag during use.

5. The device of claim 1, wherein the bag is coupled to the frame.

6. The device of claim 1, wherein the bag is conformable.

7. The device of claim 1, wherein the frame comprises one or more openings.

8. The device of claim 1, wherein the frame comprises a clamp.

9. The device of claim 8, wherein the clamp comprises two jaws that, during use, pivot to open and close around at least a portion of the subsea component.

10. The device of claim 8, further comprising a closing mechanism that, during use, closes the clamp.

11. The device of claim 1, wherein the frame comprises a hinged clamp with at least two pieces hinged together.

12. The device of claim 1, further comprising a latch that, during use, secures the frame around the subsea component.

13. The device of claim 1, wherein the insulating fluid comprises an incompressible fluid.

14. The device of claim 1, wherein the insulating fluid is an insulating gel.

15. The device of claim 1, wherein the bag, when inflated during use, is at least partially conforms to the surface of the subsea connector.

16. The device of claim 1, wherein the bag, when inflated during use, substantially seals against the surface of the subsea component to inhibit fluid from circulating between the bag and the surface of the subsea component.

17. The device of claim 1, wherein the port is during use, substantially sealed off after inflation of the bag to pressure isolate the bag.

18. The device of claim 1, further comprising an isolation valve coupled to the bag, wherein the valve, during use, isolates the bag to maintain pressure in the bag after inflation of the bag.

19. The device of claim 1, further comprising a fluid source, and a pump that, during use, pumps the fluid from the fluid source into the bag.

20. The device of claim 1, wherein the subsea component is a connector for a subsea jumper.

21. The device of claim 1, wherein the subsea component is a valve.

22. The device of claim 1, wherein the bag, when the bag is at least partially inflated subsea during use, substantially seals against at least one surface of the subsea component.

23. An insulated subsea device, comprising:
  a subsea component at least partially enclosed in a frame;
  a conformable bag at least partially enclosed in the frame;
  insulating fluid contained in the conformable bag, wherein the insulating fluid has at least partially inflated the conformable bag while the conformable bag is at subsea depths;
  wherein the conformable bag, when at least partially inflated by the insulating fluid during use, substantially seals against at least one surface of the subsea component.

24. The device of claim 23, wherein the insulating fluid is an insulating gel.

25. The device of claim 23, wherein the bag, when at least partially inflated by the insulating fluid, is substantially sealed against the surface of the subsea component to inhibit seawater from circulating between the bag and the subsea component.

26. The device of claim 23, wherein the frame has been installed on the subsea component at subsea depths.

27. The device of claim 23, wherein the frame maintains its structural integrity at subsea pressures.

28. The device of claim 23, wherein the subsea component is a valve.

29. A method of insulating a subsea component, comprising:
  providing a subsea insulation device comprising a bag to a subsea location of the subsea component;
  moving the subsea insulation device such that a frame of the device at least partially encloses the subsea component at the subsea location; and
  inflating, at the subsea location, the bag with an insulating fluid such that the bag substantially seals against at least one surface of the subsea component, wherein the bag is located at least partially between the frame and the subsea component.

30. The method of claim 29, further comprising providing the subsea insulation device, moving the subsea insulation device, or inflating the bag using a remotely operated vehicle (ROV).

31. The method of claim 29, further comprising closing jaws of a clamp coupled to the frame to at least partially enclose the subsea component.

32. The method of claim 29, further comprising engaging a latch to secure the frame around the subsea component.

33. The method of claim 29, further comprising providing the insulating fluid to the bag through a port attached to the bag.

34. The method of claim 29, wherein the insulating fluid comprises an insulating gel.

35. The method of claim 29, further comprising inflating the bag such that the bag at least partially conforms to at least one surface of the subsea connector.

36. The method of claim 29, further comprising removing at least some of the insulating fluid from the bag after inflation to inhibit air pockets from forming inside the bag.

37. The method of claim 29, further comprising isolating pressure in the bag after inflating the bag.

38. The method of claim 29, further comprising inflating the bag such that the bag substantially seals against at least one surface of the subsea connector.

39. A method of removing a subsea insulation device from a subsea component, comprising:
  removing, at a subsea location, at least some insulating fluid from a bag at least partially enclosed within a frame of the subsea insulation device at least partially deflate the bag;
  moving at least a portion of the subsea insulation device such that the frame at least partially disengages from the subsea component; and
  moving the subsea insulation device to a location away from the subsea component.

40. The method of claim 39, further comprising disengaging a latch used to secure the frame around the subsea component such that the device at least partially opens around the subsea component.

* * * * *

UNITED STATES PATENT AND TRADEMARK OFFICE
CERTIFICATE OF CORRECTION

PATENT NO. : 7,784,547 B2
APPLICATION NO. : 11/742143
DATED : August 31, 2010
INVENTOR(S) : Sanjay Konda Reddy It is certified that error appears in the above-identified patent and that said Letters Patent is hereby corrected as shown below:

Claim 15, col. 10, line 59, please delete "use, is at" and substitute therefor -- use, at --.

Claim 23, col. 11, line 17, please delete "frame;" and substitute therefor -- frame; and --.

Claim 39, col. 12, line 35, please delete "device at least" and substitute therefor -- device to at least --.

Signed and Sealed this

Sixteenth Day of November, 2010

David J. Kappos
*Director of the United States Patent and Trademark Office*